Sept. 12, 1967    P. E. CASEY    3,340,724
HYDROSTATIC TESTING DEVICE
Filed Jan. 15, 1965

PETER E. CASEY
INVENTOR

BY *Lawrence J. Bee/Cronin*
ATTORNEY

United States Patent Office 3,340,724
Patented Sept. 12, 1967

3,340,724
HYDROSTATIC TESTING DEVICE
Peter E. Casey, 4 Dale Ave., Auburn, Mass. 01501
Filed Jan. 15, 1965, Ser. No. 425,778
4 Claims. (Cl. 73—49.2)

ABSTRACT OF THE DISCLOSURE

A universal test fixture for determining the presence of cracks or flaws in fluid jacketed devices. The device to be tested is provided with a plurality of independently positionable plug means, the number of plug means corresponding to the number of ports in the device, each of which is positioned to cover a port. Pressure is applied to the plug means to form a fluid tight union with the ports and fluid is pumped into the jacketed device through one of the plugs. The presence of cracks or flaws is indicated by the presence of the fluid outside the jacket.

---

This invention relates to hydrostatic testing devices and a corresponding test method and, more particularly, to a universal hydrostatic testing system capable of interchangeably testing the different models of engine blocks or engine heads made by the various manufacturers and to a method which lends itself to a mass production type of testing operation having a lower set-up time.

While the foregoing discussion will be described in terms of a diesel cylinder head, it will be obvious to those skilled in the art after a reading of my specification, that both the described apparatus and method have equal applicability to diesel engine blocks, gasoline engine heads and blocks, transmission casings, torus covers for fluid transmissions etc.

One of the major drawbacks of the prior art testing systems resides in the fact that the device being tested is not tested under conditions that simulate the actual conditions under which the device will be used.

In the automotive industry, for example, after a cylinder block is rebored or the head is remilled, it is absolutely necessary to check the machined portion of the cylinder walls or the engine head for either porosity (pinholes due to excessive removal of metal) or cracks. Since the piece is being tested, it is also highly desirable to look for other flaws in either the head or the block that are not easily or visually observed. At this stage of the development of the art, before the advent of my device, there was no successful apparatus or methods for testing the walls or partitions between the water jacket and the cylinder or the walls between the oil galley and the water jacket for cracks or pinholes.

One prior art set-up is a leak-testing system issued to L. E. Le Mat et al. on June 19, 1962, Patent No. 3,039,295. This system has a complex arrangement of valves, conduits, and differential pressure-responsive units for charging a casing with air and then noting that the part is porous when there is a drop in pressure below a given value. However, the Le Mat system will not tell the operator the location of the leak nor does it take into consideration the fact that the piece under test will be used under different circumstances than those under which it is being tested. For example, the industry realizes the shortcomings of testing a device using air at room temperature when the device will be used with a pressurized fluid (water) at an elevated temperature. Similarly, one must also recognize the fact that the air used to test the piece is highly compressible while the water or coolant fluid is an incompressible liquid.

Another prior art test set-up involves a "Magnaflux" operation to determine the presence of cracks. However, this system also has a serious drawback in that it can only show cracks appearing on the outside of a block or head or on an exposed surface and does not test the walls or partition between the water jacket or cylinder or the walls or partitions between the oil galley and water jacket.

There are other devices that are being used for hydrostatic pressure testing or similar devices, but these take the form of a dummy head when a block is being tested or a dummy block when a head is being tested. This type of fixture limits the operation to testing only the piece for which the fixture was specifically designed and removes any possibility of universality. Also, since the dummy fixture masks the combustion chamber, it requires the appropriate gasket and is, therefore, only able to test for leaks either into the combustion chamber or leaks to the outside of the head and cannot test for leaks due to cracks or pinholes existing in the piece under the gasket. In any event, this method is very time-consuming since it requires all the head bolts to be bolted on and torqued to the proper pressure.

It is, therefore, a principal object of the present invention to provide a universal test fixture capable of hydrostatically testing castings for flaws.

Another principal object of the present invention is to provide a universal test fixture capable of rapidly, hydrostatically testing castings for flaws on a mass production type basis.

Still another principal object of the present invention is to provide a universal test fixture capable of hydrostatically testing internal portions of castings.

Yet another principal object of the present invention is to provide a novel method for testing castings for flaws wherein any of the castings made by the various manufacturers may be interchangeably tested with the same ease.

The present invention contemplates using a plurality of plugs having a "T-shaped" form which are placed over all of the water ports (regardless of their positions) except two. The two unplugged ports represent inlet and outlet ports and utilize appropriate plugs to allow a coolant or test fluid such as water to be circulated throughout the jacket. When the plugs are in place and cover the water ports, a hydraulic press or ram is brought to bear on the outermost ends of the plugs to obtain a water-tight seal for the ports appearing in the block or head. Thereafter, water is forced into the inlet port and, when water appears at the outlet port, the initially open valve or petcock in the outlet plug may be partially or entirely closed allowing the water pressure in the head or block to be built up to any desired pressure. In this manner, any hidden cracks or porous pinholes appearing between the water jacket and the oil galley may be easily detected by noting the presence of any water in the oil galley. In addition, since the water and/or the device under test will eventually be used at elevated temperatures, it now becomes possible to simulate another operating condition by raising the water temperature or raising the temperature of the piece to its operating temperature and noting the presence of any flaws which might not actually have been present had the device been tested by air under pressure. Similarly, cracks, pinholes, or other flaws in either the cylinder walls or in the combustion head become readily apparent due to the presence of the unwanted water.

The features of my invention which I believe to be novel are set forth with particularity in the appended claims. My invention, itself, however, both as to its organization and method of operation, together with further objects and advantages thereof, may be best understood by reference to the following description taken in conjunction with the accompanying drawings in which:

Figure 1:
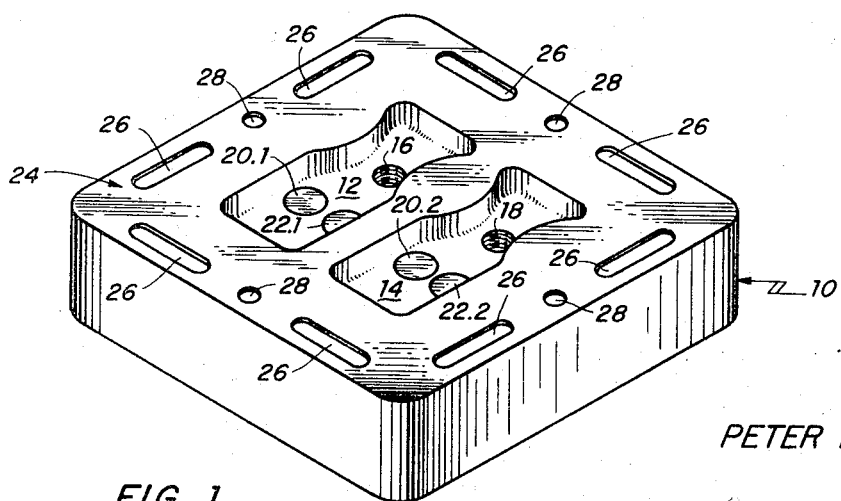
FIG. 1 is a perspective view of a typical 2-cylinder diesel engine head.

Referring now to FIG. 1, there is shown a typical 2-cylinder diesel engine head 10 with recessed combustion chambers 12 and 14. Disposed within combustion chambers 12 and 14 are the usual fuel inlet ports 16 and 18, respectively, as well as the air inlet valves 20.1, 20.2 and the outlet valves 22.1, 22.2. Surface 24 is usually highly machined and has disposed therein the usual water ports 26, which ports communicate with corresponding ports in the engine block so that there can be a free communication and flow of coolant such as water between the head and the block. In addition, there is also shown a series of apertures 28 through which bolts may be passed for bolting the head to the block which, together with a matching gasket, prevents leakage of any cooling fluid flowing between the head and the block.

Figure 2:
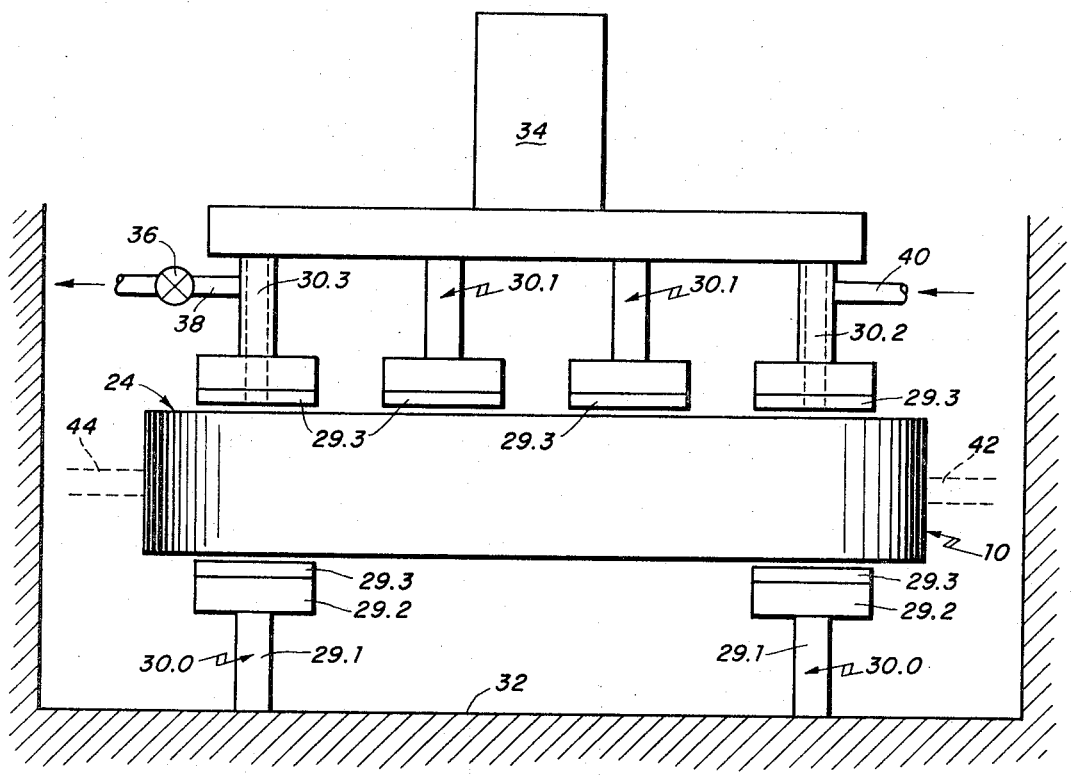
FIG. 2 is a side elevation view of the head being tested embodying the principals of my invention.

Referring now to FIG. 2, there is shown my typical engine head 10 mounted in my universal test fixture. In this figure, spacers 30.0 are first placed on bed 32 and the cylinder head under test 10 is placed thereon. These spacers 30.0 are provided with means (not shown) for leveling the head or block so that, despite the presence of any discontinuities or irregularities that may exist on the top or surface of the head, the machined surface 24 will always be maintained level to provide a level surface against which a hydraulic press or ram 34 may work. In addition, should there be a water port (as may frequently be the case) on the upper portion of the head, spacers 30.0 may be utilized to provide a liquid-tight seal.

Spacers 30.0 as well as spacers 30.1, 30.2 and 30.3 are all provided with an upright member 29.1 to which a cross member 29.2 is affixed. In addition, cross member 29.2 is provided with a gasket or rubber-type material 29.3. This soft gasket material 29.3 is used to bear directly on the head 10. Thus, when a head 10 is to be tested, it is placed on the lower spacers 30.0, upper spacers 30.1, 30.2 and 30.3 are appropriately placed over water ports 26 (FIG. 1), and the hydraulic press or ram 34 is brought to bear against upper or outermost ends of plugs 30.3, 30.2 and 30.1 so that there will be provided a water-tight seal around each port 26.

Having provided and placed plugs over all water ports 26, it should be now noted that there are two special hollow plugs, namely 30.2 and 30.3. Plug 30.2 is provided with a water inlet means 40, while plug 30.3 is provided with a water outlet means 38 to which a valve 36 is affixed.

Once my test fixture is set up as shown, inlet 40 is then connected to an appropriate source of water (not shown) which may be both pressurized and heated and water allowed to fill cylinder head 10. Since there is no other means for the water pressure to be released, the water will tend to flow out of plug 30.3 through outlet 38 and valve 36. Once water appears at the outlet in full force, valve 36 is closed (either partially or entirely) thereby pressurizing the head, and if there are any cracks or leaks in the internal partitions, it may be readily noted by both a drop in pressure and by the presence of water in either the oil galley or the combustion chamber or any other fluid-retaining wall.

There is also shown ports 42 and 44 on the sides of head 10. Should a head or a block be encountered wherein a port or ports are so located, it will now become obvious to those skilled in the art that appropriate plugs 30.0, 30.1, 30.2 or 30.3 may be utilized therein with an appropriate means such as another hydraulic press or ram to maintain a water-tight seal therein.

Having now provided the system, it will also be obvious that the following method is applicable:

A device to be tested is placed on spacers or plugs 30.0 on a bed 32 and the device levelled by means of plugs 30.0. The exposed water ports of the device under test is then provided with similar plugs for all ports except two, which latter two ports are then provided with hollow plugs 30.2 and 30.3. A hydraulic press or ram is then brought to bear against the outermost ends of the upper plugs to provide fluid-tight seals about the water ports and, thereafter, pressurized and heated water or other testing fluids are allowed to circulate freely throughout the piece under test. After the piece has been filled with the fluid, the valve 36 in the outlet plug 30.3 is shut off, whereupon the presence of leaks or testing fluid in the nonpressurized areas may be easily noted.

While I have described what is presently considered the preferred embodiment of my invention, it will be obvious to those skilled in the art that various other changes and modifications may be made therein without departing from the inventive concept, and it is aimed in the appended claims to cover all such changes and modifications as fall within the true spirit and scope of my invention.

I claim:

1. A universal hydrostatic test fixture for detecting the presence of cracks in fluid jacketed devices having a plurality of ports with random spacing therein, comprising:
    an equal plurality of plug means;
    bed means;
    a portion of the plug means resting on the bed means and independently positionable on said bed means to correspond to the ports in the bottom surface of the fluid jacketed device being tested;
    others of said plug means resting on the top surface of said device and independently positionable on the said top surface over the individual ports in said top surface;
    means for applying force to the top of the plug means on top of said device to simultaneously force said plug means against said top surface and to force said device against the plug means on said bed means to close the ports and to form a fluid-tight union between the plugs and the respective ports of the device;
    at least one of the plug means being hollow to allow the passage of fluid therethrough;
    means applying pressurized fluid into the hollow plug means;
    whereby the presence of fluid outside the fluid jacket of the device indicates the presence of a crack in the fluid jacket.

2. The device of claim 1 wherein:
    one other of the plurality of plugs is hollow to allow the passage of the fluid therethrough, and
    means allowing at least a portion of the pressurized fluid to escape solely through the other hollow plug means.

3. The device of claim 2 wherein said fluid is water at an elevated temperature.

4. The device of claim 3 further comprising:
    valve means in the other hollow plug means to regulate the pressure of the pressurized fluid through the device.

References Cited

UNITED STATES PATENTS

| | | | |
|---|---|---|---|
| 1,554,637 | 9/1925 | McKee. | |
| 1,572,158 | 2/1926 | Mueller et al. | 73—46 |
| 2,961,868 | 11/1960 | Hooper | 73—40 |
| 3,221,539 | 12/1965 | Evans et al. | 73—45.2 |

LOUIS R. PRINCE, *Primary Examiner.*

J. NOLTON, *Assistant Examiner.*